United States Patent
Ueyama et al.

(10) Patent No.: US 10,601,490 B2
(45) Date of Patent: Mar. 24, 2020

(54) RADIO COMMUNICATION SYSTEM

(71) Applicant: OMRON Corporation, Kyoto-shi, Kyoto (JP)

(72) Inventors: Yuki Ueyama, Kyoto (JP); Manh Tai Nguyen, Kyoto (JP); Soji Ohmae, Kyoto (JP); Akito Murai, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/346,686

(22) PCT Filed: Oct. 26, 2017

(86) PCT No.: PCT/JP2017/038689
§ 371 (c)(1),
(2) Date: May 1, 2019

(87) PCT Pub. No.: WO2018/123239
PCT Pub. Date: Jul. 5, 2018

(65) Prior Publication Data
US 2019/0312626 A1    Oct. 10, 2019

(30) Foreign Application Priority Data

Dec. 26, 2016 (JP) .................................. 2016-251662

(51) Int. Cl.
*H04B 7/08* (2006.01)
*H04B 1/525* (2015.01)
(Continued)

(52) U.S. Cl.
CPC .............. *H04B 7/08* (2013.01); *H04B 1/525* (2013.01); *H04B 7/10* (2013.01); *H04W 4/38* (2018.02); *H04W 16/28* (2013.01)

(58) Field of Classification Search
CPC . H04B 7/08; H04B 7/10; H04B 1/525; H04B 7/0837; H04W 16/28; H04W 4/38
See application file for complete search history.

(56) References Cited

U.S. PATENT DOCUMENTS 5,274,844 A * 12/1993 Harrison .............. H01Q 3/2605
   342/368
5,933,466 A *  8/1999 Oshima ................ H04B 7/0857
   375/347
(Continued)

FOREIGN PATENT DOCUMENTS

JP    2006-270216 A    10/2006
JP    2008-193224 A     8/2008
(Continued)

OTHER PUBLICATIONS

English translation of the International Search Report ("ISR") of PCT/JP2017/038689 dated Jan. 16, 2018.
(Continued)

*Primary Examiner* — Jean B Corrielus
(74) *Attorney, Agent, or Firm* — Metrolex IP Law Group, PLLC

(57) ABSTRACT

Provide is a radio communication system suitable for use in a factory or the like. The radio communication system includes a receiver provided with a plurality of antennas, and a transmitter for periodically transmitting a radio signal for information transmission including information to be notified to the receiver, and the receiver is an information receiver. Based on the output of each antenna during a period in which the transmission radio signal is not transmitted, a weighting factor for each antenna is generated, and the generated weighting factor is used to process the radio signal for information transmission from the receiver.

3 Claims, 14 Drawing Sheets

(51) Int. Cl.
*H04W 4/38* (2018.01)
*H04W 16/28* (2009.01)
*H04B 7/10* (2017.01)

(56) References Cited

U.S. PATENT DOCUMENTS

| | | | |
|---|---|---|---|
| 6,087,986 A * | 7/2000 | Shoki | G01S 3/28 |
| | | | 342/383 |
| 7,369,631 B1 * | 5/2008 | Gifford | H04B 7/0837 |
| | | | 375/346 |
| 2006/0217158 A1 | 9/2006 | Uwano et al. | |
| 2010/0046462 A1 | 2/2010 | Uwano et al. | |
| 2010/0128643 A1 * | 5/2010 | Tanaka | H04B 7/0615 |
| | | | 370/280 |
| 2015/0311970 A1 | 10/2015 | Toh et al. | |

FOREIGN PATENT DOCUMENTS

| | | |
|---|---|---|
| JP | 2010-074541 A | 4/2010 |
| JP | 2013-175981 A | 9/2013 |
| JP | 2016-058845 A | 4/2016 |
| WO | 2014/087835 A1 | 6/2014 |

OTHER PUBLICATIONS

English translation of the Written Opinion("WO") of the International Searching Authority of PCT/JP2017/038689 dated Jan. 16, 2018.

* cited by examiner

FIG. 6
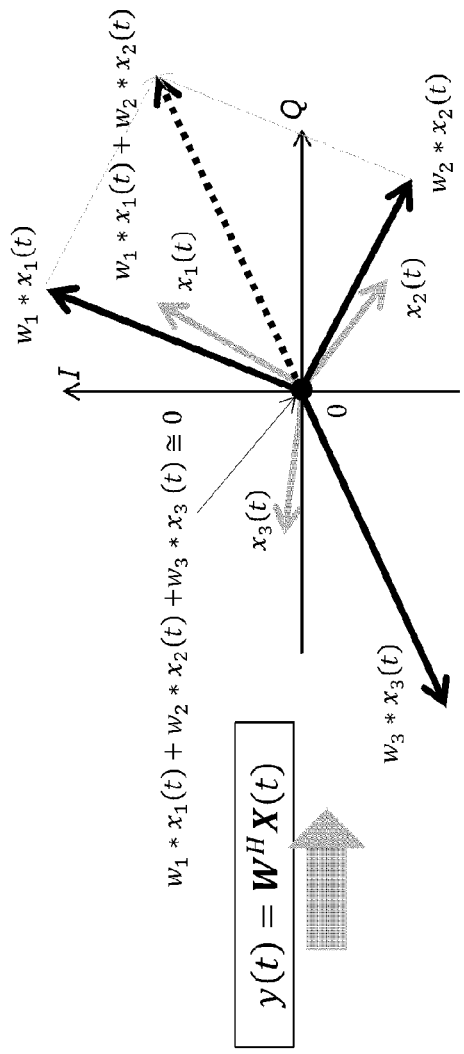
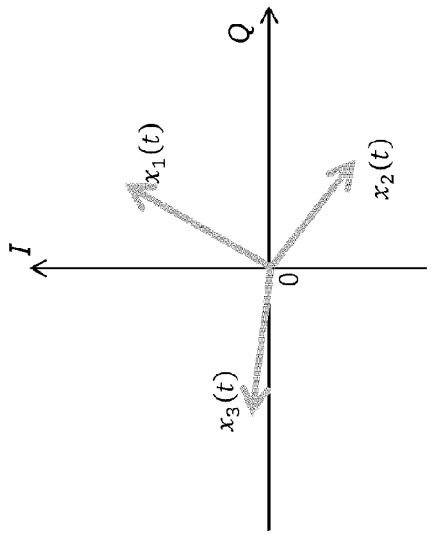

RADIO COMMUNICATION SYSTEM

TECHNICAL FIELD

The present invention relates to a radio communication system used in a factory or the like.

BACKGROUND ART

For a radio communication system which wirelessly collects information in various places such as factories where various radio noises travel in all directions, it is desired to resist interference waves (radio wave noises with the same frequency band as radio signals for information transmission).

In the fields of mobile communication and indoor radio communication, the directivity of an array antenna is controlled to reduce the adverse effects of interference waves (see PTL 1 and 2). However, existing techniques for mobile communication and indoor radio communication generally require complicated processing, and it also takes time to control the antenna beam. Therefore, it is difficult to apply the techniques for mobile communication and indoor radio communication to a radio communication system used in a factory or the like.

CITATION LIST

Patent Literature

[PTL 1] Japanese Patent Application Publication No. 2006-270216
[PTL 2] Japanese Patent Application Publication No. 2010-074541

SUMMARY OF INVENTION

Technical Problem

The present invention has been made in view of the above-mentioned present situation, and an object of the present invention is to provide a radio communication system suitable for use in a factory or the like.

Solution to Problem

In order to solve the above problems, a radio communication system according to a first aspect of the present invention includes
a receiver; and
a transmitter configured to periodically transmit a radio signal for information transmission including information to be notified to the receiver;
wherein the receiver includes
a plurality of antennas;
a composite signal generation unit configured to generate a composite signal by multiplying a signal output from each antenna when receiving the radio signal for information transmission by a weighting factor for the each antenna to combine the resulting signals from the respective antennas each having been applied with the weighting factor;
a reception processing unit configured to identify information included in the radio signal for information transmission based on the composite signal generated by the composite signal generation unit; and
a weighting factor generation unit configured to generate the weighting factor for each antenna that is used for the composite signal generation unit to generate the composite signal, wherein the weighting factor generation unit generates the weighting factor for each antenna based on a plurality of signals output from the plurality of antennas during a period in which the transmitter does not transmit the radio signal for information transmission such that a composite signal obtained by combining signals each resulting from multiplying each of the plurality of signals by the corresponding weighting factor is minimized.

That is, in the radio communication system according to the first aspect of the present invention, based on the signals output from the respective antennas during a period in which the transmitter does not transmit the radio signal for information transmission, a weighting factor for each antenna is calculated such that a composite signal obtained by combining signals each resulting from multiplying each of the plurality of signals by the corresponding weighting factor is minimized. Since the calculated weighting factor for each antenna is then used for processing the radio signal for information transmission, the condition of interference waves at the time of operation of the weighting factor generation unit and the condition of interference waves at the time of reception of the radio signal for information transmission are the same, the composite signal generated by the composite signal generation unit does not include a component caused by the interference waves. Therefore, the radio communication system according to the first aspect of the present invention functions as a system capable of well performing communication between the transmitter and the receiver even in the presence of radio noise, that is, a system suitable for use in a factory or the like.

The receiver of the radio communication system according to the first aspect of the present invention only needs to be a device that allows the weighting factor generation unit to function before the composite signal generation unit functions (operates). That is, the receiver may allow the weighting factor generation unit to function L times ($\geq 2$) when the weighting factor generation unit functions once, or may allow the weighting factor generation unit to function every time the weighting factor generation unit functions. However, in the case where the radio communication system according to the first aspect of the present invention is used in a place where the condition of interference waves is likely to change, it is preferable that the receiver is employed as a receiver that allows the weighting factor generation unit to function every time the weighting factor generation unit functions. Further, in order to be able to change the execution frequency of the weighting factor generation unit depending on the condition, the receiver of the radio communication system of the first aspect of the present invention may additionally include a generation frequency adjustment unit configured to change a generation frequency of the weighting factor in the weighting factor generation unit.

Further, in order to solve the above problems, a radio communication system according to a second aspect of the present invention is
a radio communication system including a plurality of communication systems,
wherein each of the plurality of communication systems includes
a receiver; and
a transmitter configured to periodically transmit a radio signal for information transmission including information to be notified to the receiver and to transmit a radio signal for learning with a same frequency and a same intensity as the radio signal for information transmission during a period in which the radio signal for information transmission is not transmitted, the transmitter of each communication system transmits the radio signal for information transmission at a same time, the transmitter of each communication system transmits the radio signal for learning for each of the plurality of communication systems so that there is a time zone in which the transmitter of the corresponding communication system does not transmit the radio signal for learning but the transmitters of other communication systems transmit the radio signal for learning, and the receiver of each communication system includes a plurality of antennas;

a composite signal generation unit configured to generate a composite signal by multiplying a signal output from each antenna when receiving the radio signal for information transmission from the transmitter of the corresponding communication system by a weighting factor for the each antenna to combine the resulting signals from the respective antennas each having been applied with the weighting factor;

a reception processing unit configured to identify information included in the radio signal for information transmission from the transmitter of the corresponding communication system, from the composite signal generated by the composite signal generation unit; and a weighting factor generation unit configured to generate the weighting factor for each antenna that is used for the composite signal generation unit to generate the composite signal, wherein the weighting factor generation unit generates the weighting factor for each antenna based on a plurality of signals output from the plurality of antennas in the time zone in which the transmitter of the corresponding communication system does not transmit the radio signal for learning but the transmitters of other communication systems transmit the radio signal for learning such that a composite signal obtained by combining signals each resulting from multiplying each of the plurality of signals by the corresponding weighting factor is minimized.

That is, the radio communication system according to the second aspect of the present invention has a configuration such that packets transmitted by N−1 transmitters in the system are interference waves for a packet transmitted by the remaining one transmitter where N represents the number of communication systems. However, the transmitter of each communication system transmits the radio signal for learning for each of the plurality of communication systems so that there is the time zone in which the transmitter of the corresponding communication system does not transmit the radio signal for learning but the transmitters of other communication systems transmit the radio signal for learning. Therefore, signals received by a plurality of antennas in a time zone in which only the transmitter of a certain communication system (hereinafter referred to as a system of interest) does not transmit a radio signal for learning are each composed of a signal corresponding to a packet transmitted by the transmitter included in each communication system other than the system of interest (hereinafter, referred to as a first type interference wave) plus an interference wave not due to the packet (hereinafter, referred to as a second interference wave). Further, in the radio communication system according to the second aspect of the present invention, based on the signals received by the plurality of receivers in the time zone, a weighting factor for each antenna is calculated such that a composite signal obtained by combining signals each resulting from multiplying each of the plurality of signals by the corresponding weighting factor is minimized, and the calculated weighting factor is used for processing the radio signal for information transmission from the transmitter included in the system of interest. Accordingly, if the condition of the second type interference wave at the time of operation of the weighting factor generation unit and the condition of the second type interference wave at the time of reception of the radio signal for information transmission are the same, the composite signal generated by the composite signal generation unit does not include any component due to the first type interference wave or the second type interference wave. Therefore, the radio communication system according to the second aspect of the present invention functions as a system capable of well performing communication between the transmitter and the receiver even in the presence of radio noise, that is, a system suitable for use in a factory or the like.

Further, in a system including a plurality of transmitters configured to transmit packets with a same frequency and a plurality of receivers, it is normally necessary to shift the transmission time of packets of the respective transmitters in order to well perform communication between the transmitter and the receiver, and it is also necessary to extend the transmission cycle of packets (that is, to reduce the amount of information to be communicated within a unit time) in order to shift the transmission time of packets of the respective transmitters. Further, according to the radio communication system of the second aspect of the present invention, even when several transmitters transmit packets at a same time, the respective receivers can receive the packets without any problem. Therefore, the radio communication system according to the second aspect of the present invention is also a system allowing a large amount of information to be communicated within a unit time, as compared to the system in which the transmission time of packets of the respective transmitters is shifted.

As with the receiver of the radio communication system according to the first aspect, the receiver of the radio communication system according to the second aspect of the present invention only needs to be a device that allows the weighting factor generation unit to function before the composite signal generation unit functions. That is, the receiver may allow the weighting factor generation unit to function L times (≥2) when the weighting factor generation unit functions once, or may allow the weighting factor generation unit to function every time the weighting factor generation unit functions. Further, in the case where the radio communication system according to the second aspect of the present invention is used in a place where the condition of interference waves (the second type interference waves) is likely to change, it is preferable that the receiver is employed as a receiver that allows the weighting factor generation unit to function every time the weighting factor generation unit functions.

Further, in order to solve the above problems, a radio communication system according to a third aspect of the present invention is a radio communication system including first to N-th communication systems (N≥2), wherein each of the first to N-th communication systems includes a receiver; and first to M-th transmitters (M≥2) each configured to periodically transmit a radio signal for information transmission including information to be notified to the receiver and to transmit a radio signal for learning with a same frequency and a same intensity as the radio signal for information transmission during a period in which the radio signal for information transmission is not transmitted, the first to M-th transmitters of each communication system sequentially transmit the radio signal for information transmission, a k-th transmitter (k=1 to M) of the first to N-th communication systems transmits the radio signal for information transmission at a same time, each transmitter included in the radio communication system transmits the radio signal for learning for each combination of a value i ranging from 1 to N and a value j ranging from 1 to M so that there is a time zone in which a j-th transmitter of each communication system other than an i-th communication system transmits the radio signal for learning but other transmitters do not transmit the radio signal for learning, and the receiver of each communication system includes a plurality of antennas;

a composite signal generation unit configured to generate a composite signal by multiplying a signal output from each antenna when receiving the radio signal for information transmission by a weighting factor to combine the resulting signals from the respective antennas each having been applied with the weighting factor, the composite signal generation unit generating the composite signal by using a weighting count for the transmitter having transmitted the received radio signal for information transmission;

a reception processing unit configured to identify information included in the received radio signal for information transmission, from the composite signal generated by the composite signal generation unit; and a weighting factor generation unit configured to generate and manage weighting factors for the first to M-th transmitters used by the composite signal generation unit, wherein the weighting factor generation unit generates the weighting factor for each antenna based on a plurality of signals output from the plurality of antennas in a time zone in which a k-th transmitter of each communication system other than the corresponding communication system transmits the radio signal for learning but other transmitters do not transmit the radio signal for learning such that a composite signal obtained by combining signals each resulting from multiplying each of the plurality of signals by the corresponding weighting factor is minimized, and manages the generated weighting factor as a weighting factor for the k-th transmitter.

In other words, the radio communication system according to the third aspect of the present invention is a system obtained by modifying the radio communication system according to the second aspect so that each receiver can accommodate M transmitters by time multiplexing. Therefore, as with the radio communication system of the second aspect, the radio communication system of the third aspect is a system capable of well performing communication between the transmitter and the receiver even in the presence of radio noise, and also a system allowing a large amount of information to be communicated within a unit time, as compared to the system in which the transmission time of packets of all transmitters is shifted.

Advantageous Effects of Invention

According to the present invention, it is possible to provide a radio communication system suitable for use in a factory or the like.

BRIEF DESCRIPTION OF DRAWINGS

FIG. 6 is an explanatory diagram of contents of the data reception process.

DESCRIPTION OF EMBODIMENTS

Hereinafter, embodiments of the present invention will be described based on the embodiments with reference to the drawings.

First Embodiment

Figure 1:
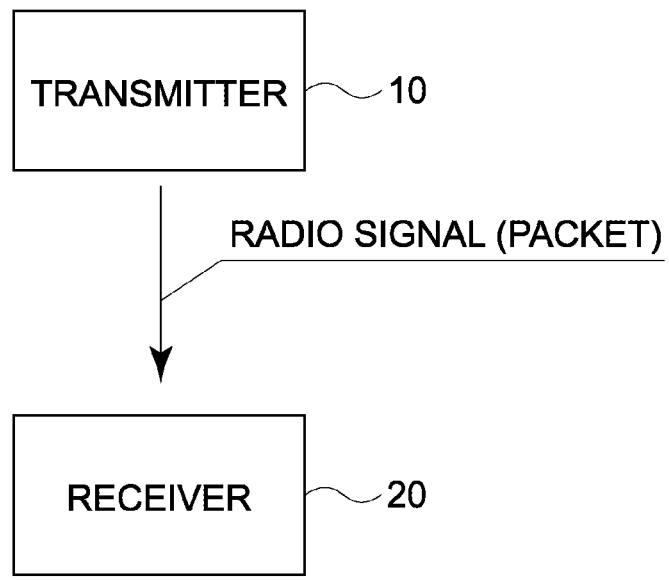
FIG. 1 is a block diagram of a radio communication system according to a first embodiment of the present invention.

FIG. 1 illustrates a configuration of a radio communication system according to the first embodiment of the present invention.

As illustrated, the radio communication system according to the present embodiment is a system including one transmitter 10 and one receiver 20.

The transmitter 10 serving as a component of the radio communication system according to the present embodiment is a device that periodically transmits a radio signal (hereinafter also referred to as a packet) including information to be transmitted to the receiver 20.

The transmitter 10 may be a device having a fixed transmission cycle of a packet, or may be a device capable of changing (specifying) the transmission cycle of a packet.

Alternatively, the transmitter 10 may be a device having a fixed transmission timing (transmission start timing) of a packet, or may be a device capable of changing the transmission timing of a packet. Furthermore, the hardware configuration of the transmitter 10 and the type/content of information to be transmitted are not particularly limited.

Figure 2:
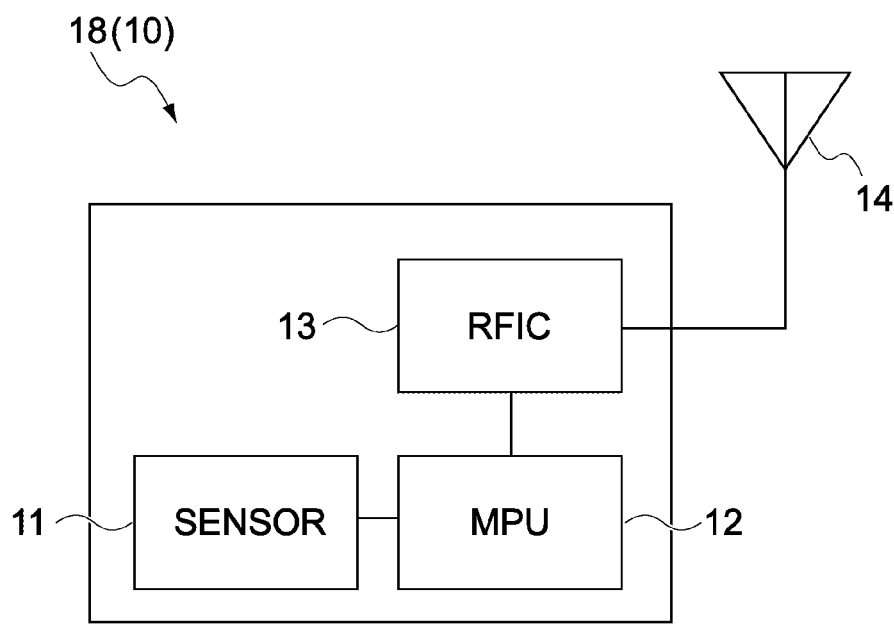
FIG. 2 is an explanatory diagram of an example of hardware of a transmitter of the radio communication system according to the first embodiment.

For example, as the transmitter 10, a device having the configuration illustrated in FIG. 2 may be used. A transmitter 18 illustrated in this figure is a device that periodically packetizes and transmits information (temperature information, position information, and the like) detected by a sensor 11. The transmitter 18 includes an MPU (Micro-processing unit) 12, an RFIC (Radio Frequency Integrated Circuit) 13 and an antenna 14 in addition to the sensor 11. The RFIC 13 included in the transmitter 18 is an integrated circuit that generates a high frequency electric signal to be converted into a radio wave (radio signal, packet) by the antenna 14. The MPU 12 is a unit that generates information (digital data) to be transmitted to the receiver 20 based on the output of the sensor 11, and periodically performs processing for controlling the RFIC 13 so that a packet including the generated information is transmitted from the antenna 14.

The receiver 20 (FIG. 1) is a device that receives each packet from the transmitter 10, identifies the information transmitted by the received packet, and notifies the identified information to a higher-level device (not illustrated) such as a computer.

Figure 3:
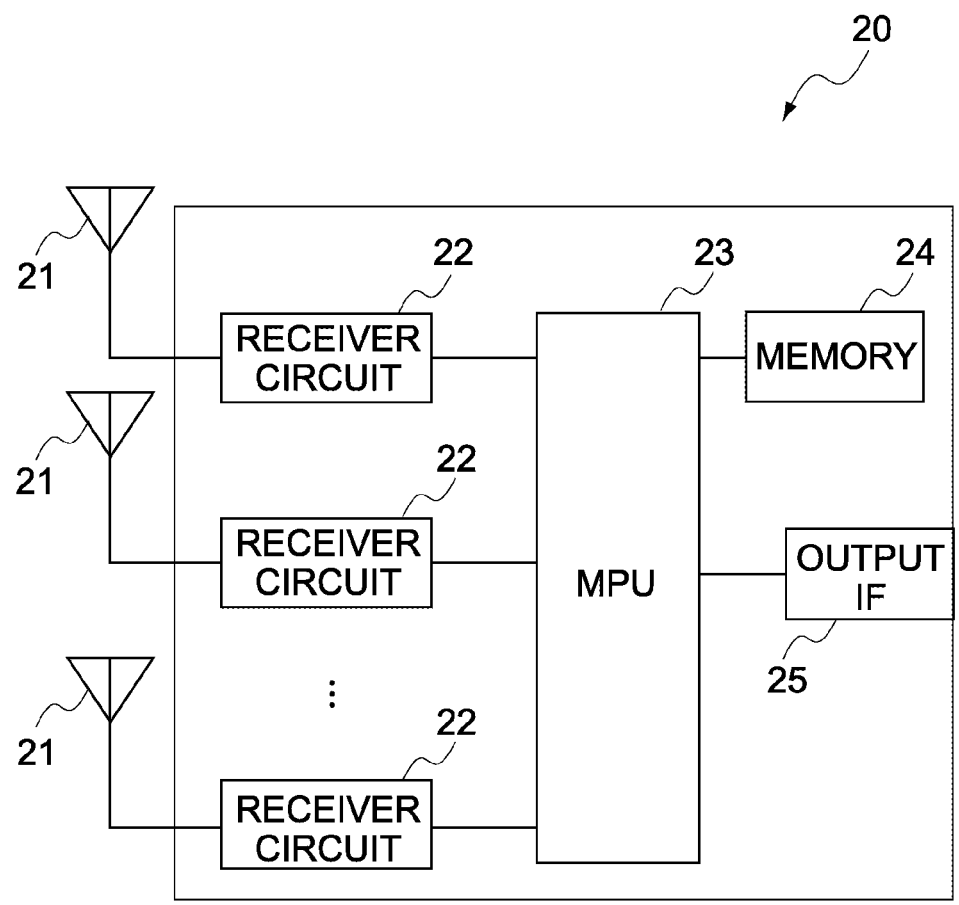
FIG. 3 is a schematic configuration diagram of a receiver of the radio communication system according to the first embodiment.

FIG. 3 illustrates a schematic configuration of the receiver 20. As illustrated in FIG. 3, the receiver 20 includes a plurality of antennas 21, a receiving circuit 22 provided for each of the antennas 21, an MPU 23, a memory 24, and an output IF 25.

The plurality of antennas 21 included in the receiver 20 are an array antenna. That is, these antennas 21 are attached to the housing of the receiver 20 in an arrangement (positional relationship) such that the antenna directivity can be easily controlled.

The receiving circuit 22 coupled to each antenna 21 is a circuit that includes a band pass filter for extracting a frequency component of a packet transmitted by the transmitter 10 from an output (high frequency signal) of the antenna 21, an amplifier circuit for amplifying a signal passing through the band pass filter, and an A/D converter for converting an analog signal from the amplifier circuit into a digital signal.

The output IF 25 is an interface circuit with a higher-level device such as a computer. The memory 24 is a storage device (RAM in the present embodiment) used by the MPU 23 to temporarily store various information.

The MPU 23 is a unit that identifies the information transmitted by the packet based on the data from each of the receiving circuits 22 and periodically performs processing of notifying the identified information to the higher-level device through the output IF 25. This MPU 23 is configured (programmed) to start a data reception process of a procedure illustrated in FIG. 4 when the power of the receiver 20 is turned on.

That is, when the power of the receiver 20 is turned on, the MPU 23 first executes a timing adjustment process (step S100).

At the time of the timing adjustment process, the MPU 23 monitors the output of each of the receiving circuits 22 to grasp the transmission timing and transmission cycle of a packet of the transmitter 10. Thereafter, based on the grasped result, the MPU 23 changes the process the start timing and the execution cycle of the processes of steps S101 to S108 described later so that the execution cycle of the processes of steps S101 to S108 matches the grasped transmission cycle and a waiting time for the packet transmission timing is a specified time. It is noted that the waiting time for the packet transmission timing is a time until the process of step S105 is started after the process of step S103 is completed.

When the timing adjustment process is completed, the MPU 23 starts the processes after step S101. For convenience of explanation, first, the processes of steps S104 to S108 will be described.

In step S104, the MPU 23 waits for the packet transmission timing of the transmitter 10. It is noted that the process of step S104 may be a process of waiting for the above-mentioned "specified time" to elapse.

When the packet transmission timing of the transmitter 10 is reached, the NPU 23 collects reception signals from the respective antennas 21 for a duration time of one packet, and multiplies the collected reception signals of the respective antennas 21 by weighting factors for the respective antennas 21 stored in the memory 24 (step S105). Here, the reception signal of each antenna 21 is a signal output from the receiving circuit 22 coupled to the corresponding antenna 21. The weighting factor for each antenna 21 is a weighting factor stored in the memory 24 individually for each antenna 21, the details of which will be described later.

The MPU 23, when completing the process of step S105, combines the received signals each multiplied by the weighting factor (step S106). Then, the MPU 23 identifies information included in the packet received this time from the combined signal (hereinafter referred to as a composite signal) (step S107), outputs the identified information to the higher-level device via the output IF 25 (step S108), and then starts the process of step S101 and the subsequent processes.

As apparent from the above description, the processes performed by the MPU 23 in steps S105 and S106 to generate the composite signal from the reception signals of the respective antennas 21 (hereinafter referred to as a composite signal generation process) is essentially the same as a process performed to control the directivity of an array antenna.

However, the MPU 23 of the receiver 20 according to the present embodiment is configured to calculate the weighting factors for the respective antennas 21 used in the composite signal generation process from the reception signals of the respective antennas 21 during a period in which the transmitter 10 does not transmit a packet.

Figure 4:
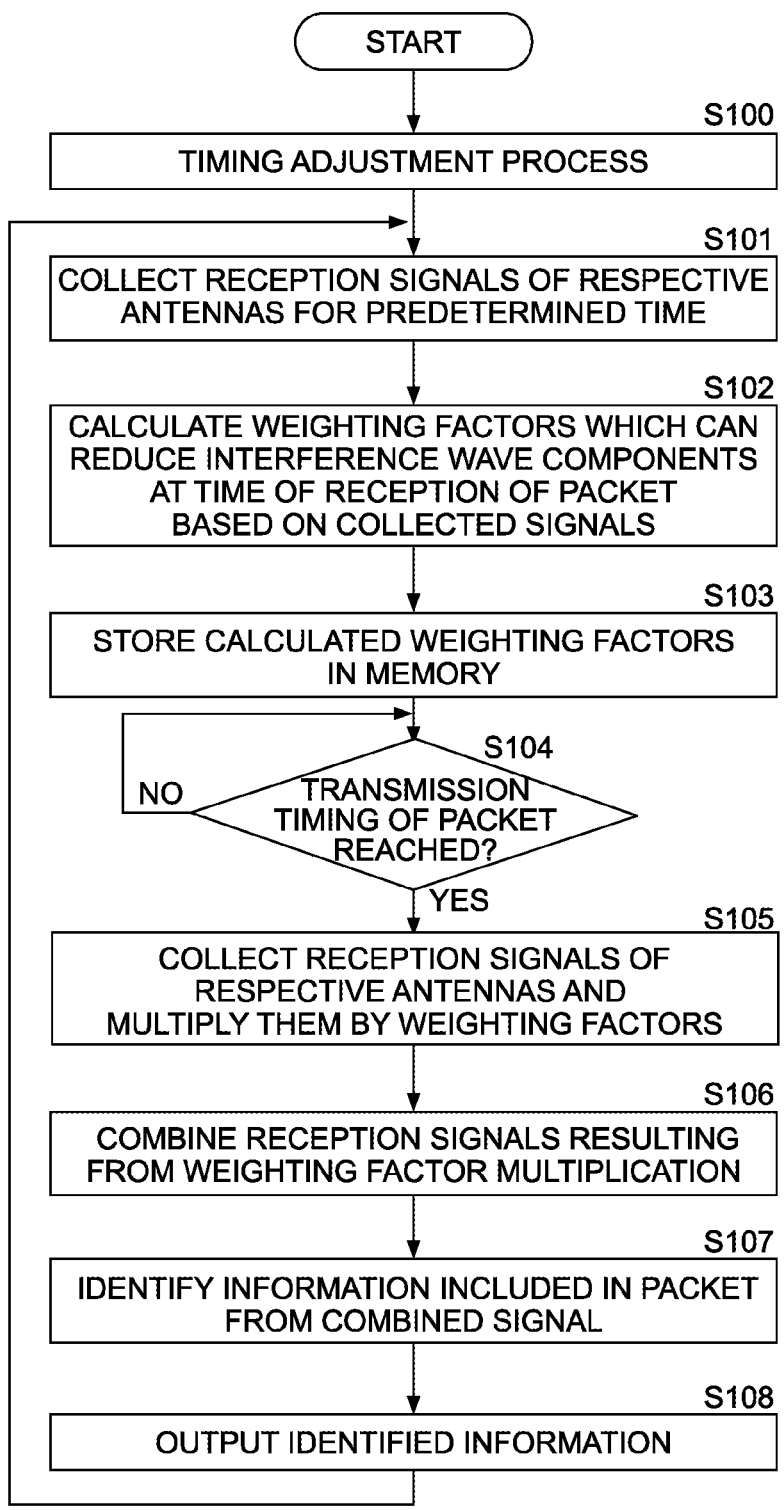
FIG. 4 is a flowchart of a data reception process performed by the receiver of the radio communication system according to the first embodiment.

Specifically, as illustrated in FIG. 4, the MPU 23 collects the reception signals of the respective antennas 21 for a predetermined time in step S101 to be executed before the packet transmission timing of the transmitter 10 is reached. In other words, the NPU 23 collects the reception signals of the respective antennas 21 for the predetermined time during the period in which the transmitter 10 does not transmit a packet. It is noted that the predetermined time in the process of step S101 only needs to be equal to or less than the duration of the period in which the transmitter 10 does not transmit a packet.

Then, the MPU 23 calculates, based on the collected signals, weighting factors for the respective antennas 21 which can reduce interference wave components at the time of reception of a packet (step S102).

Here, the contents of the processes of steps S101 and S102 will be specifically described with reference to FIG. 5 and FIG. 6 as an example where the number of antennas 21 is three. It is noted that in FIG. 5, FIG. 6, and the following description, $X^H$ and $W^H$ are the Hermitian conjugate (Hermitian transpose) of X and W, respectively.

Figure 5:
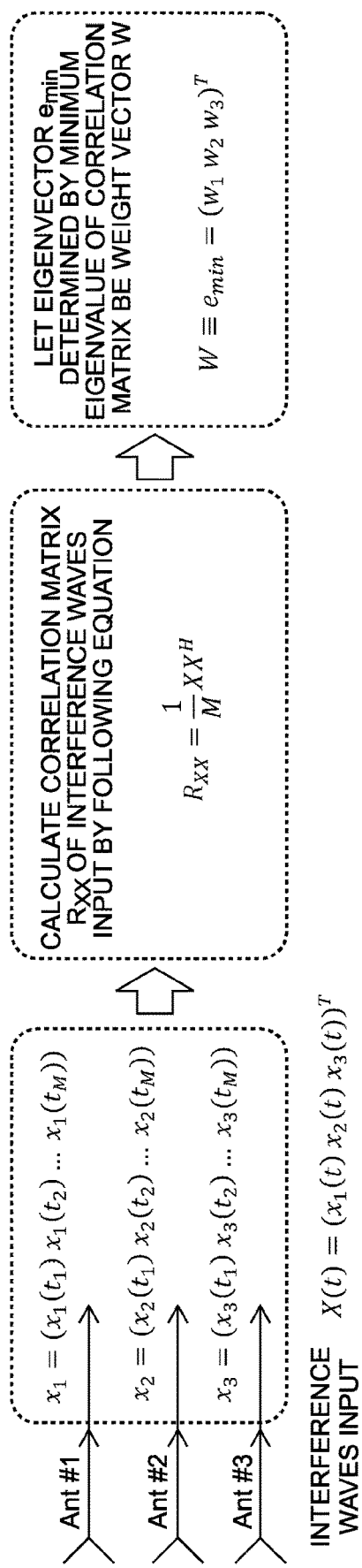
FIG. 5 is an explanatory diagram of contents of the data reception process.

If the number of antennas 21 is three, M outputs of three antennas 21 (Ant #1 to #3 in FIG. 5) are collected in step S101 as schematically illustrated in FIG. 5. Then, in step S102, a correlation matrix $R_{XX}$ of X(t) is obtained from M interference wave inputs X(t) (=$(x_1(t), x_2(t), x_3(t))^T$). Thereafter, an eigenvector $e_{min}$ determined by the minimum eigenvalue of the correlation matrix $R_{XX}$ is calculated as a weight vector W (a vector having a weighting factor for each antenna as an element).

The weight vector W calculated as described above is a vector other than "0", which satisfies $W^H \cdot X(t)=0$. Therefore, the weight vector W for which $W^H \cdot X(t) \approx 0$ (the weighting factor for each antenna 21) is calculated in step S102 as schematically illustrated in FIG. 6.

Referring back to FIG. 4, the remaining steps of the data reception process will be described.

The MPU 23, when calculating the weighting factors for the respective antennas 21 as described above, stores the calculated weighting factors in the memory 24 (step S103). In this step S103, if no weighting factor for each antenna 21 has been stored in the memory 24, the MPU 23 simply stores the weighting factors for the respective antennas 21 calculated this time in the memory 24. Further, if weighting factors for the respective antennas 21 have already been stored in the memory 24, the MPU 23 rewrites the existing weighting factors with the weighting factors for the respective antennas 21 calculated this time.

Then, the MPU 23, when completing the process of step S103, executes the process of step S104 and the subsequent processes.

Hereinafter, the contents of the data reception process (FIG. 4) will be more specifically described with reference to FIG. 7 and FIG. 8.

Figure 7:
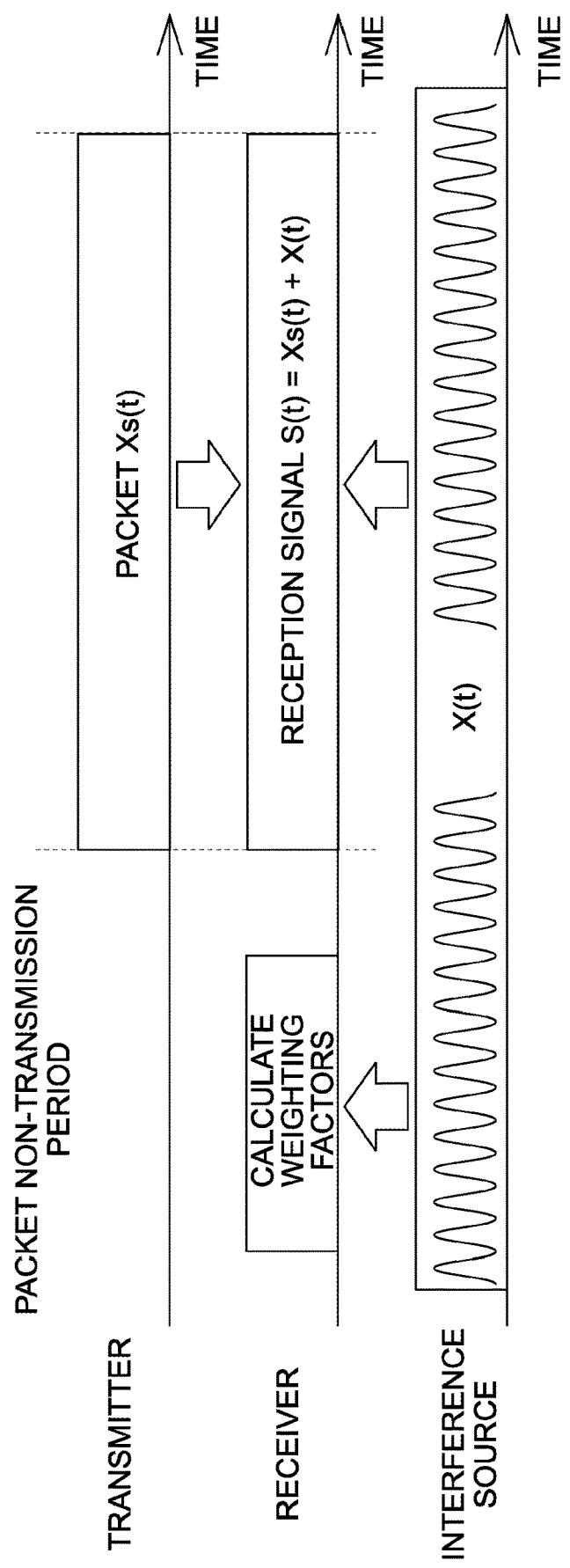
FIG. 7 is an explanatory diagram of contents of the data reception process.
Figure 8:
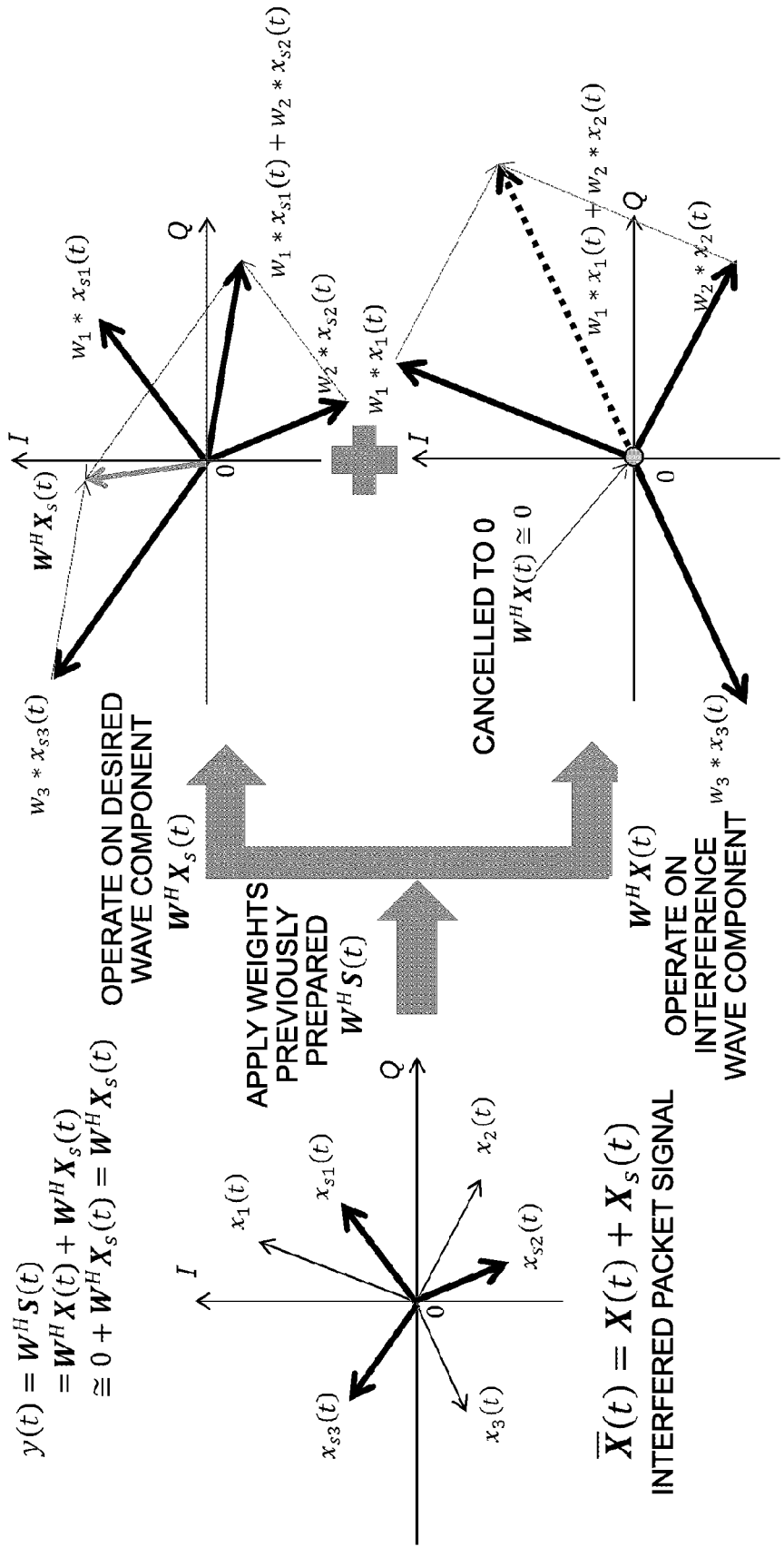
FIG. 8 is an explanatory diagram of contents of the data reception process.

Consider a case where an interference wave X(t) with the same frequency as the frequency of a packet transmitted by the transmitter 10 is transmitted from an interference source located in the vicinity of the wireless transmission system according to the present embodiment at a timing as illustrated in FIG. 7.

In this case, the receiver 20 (MPU 23) calculates a weight vector W that satisfies $W^H \cdot X(t)=0$ and is other than "0" from the received signal X(t) of each antenna 21 during the period in which the transmitter 10 does not transmit a packet, and stores the calculated weight vector W in the memory 24.

Further, the receiver 20 receives a signal $S(t)=X_S(t)+X(t)$ during transmission of a packet $X_S(t)$ by the transmitter 10. Accordingly, the receiver 20 performs the composite signal generation process, so that the operation of the following Equation (1) is performed when the packet $X_S(t)$ is received.

$$W^H \cdot S(t) = W^H \cdot X_S(t) + W^H \cdot X(t) \qquad (1)$$

The weight vector W is a vector that satisfies $W^H \cdot X(t)=0$ and is other than "0". Therefore, as illustrated in FIG. 8, the value of the second term of the right side of Equation (1) is almost zero. Accordingly, in the process of step S107 of the data reception process, information included in the packet is identified from the composite signal in which the influence of the interference wave X(t) is removed: $W^H \cdot S(t) = W^H \cdot X_S(t)$.

As described above, in the radio communication system according to the present embodiment, based on the plurality of signals output from the respective antennas 21 during a period in which the transmitter 10 does not transmit a packet, a weighting factor for each antenna 21 is calculated such that a composite signal obtained by combining signals each resulting from multiplying each of the plurality of signals by the corresponding weighting factor is minimized. Since the calculated weighting factor for each antenna 21 is then used for processing the packet, the condition of interference waves at the time of calculation of the weighting factor and the condition of interference waves at the time of processing of the packet are the same, the composite signal generated at the time of reception of the packet does not include a component caused by the interference waves. Therefore, the radio communication system according to the present embodiment functions as a system capable of well performing communication between the transmitter 10 and the receiver 20 even in the presence of radio noise, that is, a system suitable for use in a factory or the like.

Second Embodiment

Hereinafter, a radio communication system according to a second embodiment of the present invention will be described focusing on differences from the radio communication system according to the first embodiment. In the following description of each embodiment, the radio communication system according to the n-th (n=1 to 3) embodiment is referred to as an n-th radio communication system.

Figure 9:
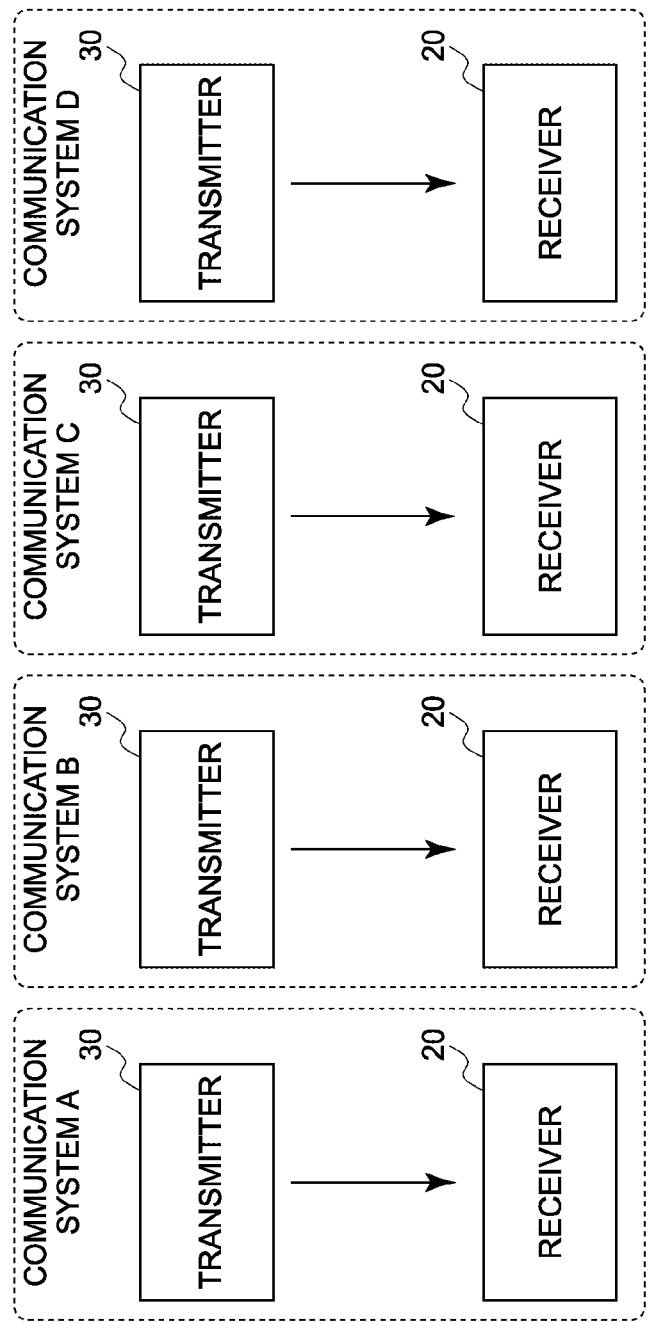
FIG. 9 is a block diagram of a radio communication system according to a second embodiment of the present invention.

FIG. 9 illustrates an example of the configuration of a second radio communication system (a radiocommunication system according to the second embodiment). As illustrated, the second radio communication system includes a plurality of communication systems (four communication systems A to D in the figure) each including one transmitter 30 and one receiver 20.

The receiver 20 (hereinafter, also referred to as a second receiver 20) serving as a component of the second radio communication system is a device obtained by modifying the receiver 20 of the first radio communication system so that the MPU 23 performs processes (details of which will be described later) different from the processes described above.

The transmitter 30 serving as a component of the second radio communication system is a device having a hardware configuration similar to that of the transmitter 18 (FIG. 2), and periodically transmits a packet (radio signal) with a predetermined frequency, as with the transmitter 10. However, the transmitter 30 has a function of periodically transmitting a radio signal for learning with the same frequency and intensity as the packet, and a timing changing function of changing the transmission timings of the packet and the radio signal for learning in accordance with an instruction from an external device.

Then, at the time of setup of the second radio communication system, the transmission timings of the packet of each transmitter 30 and the radio signal for learning are adjusted by using the timing changing function of each transmitter 30 so as to satisfy the following two conditions.

The transmission timings of the packets of the respective transmitters 30 coincide with each other. •For each communication system in the radio communication system, there is a time zone in which only the transmitter 30 in the communication system does not transmit the radio signal for learning (a time zone in which the transmitter 30 in the communication system does not transmit the radio signal for learning but other transmitters 30 transmit the radio signal for learning).

Specifically, at the time of setup of the second communication system, by an operation on a higher-level device coupled to a certain receiver 20, work of setting in the receiver 20 (hereinafter referred to as the master receiver 20)

a device ID of the transmitter 30 and a device ID of the receiver 20 is performed for each communication system. When the work is completed, the master receiver 20 (NPU 23) communicates with each transmitter 30 by using the device ID, so that the transmission timings of the packet and the radio signal for learning of each transmitter 30 are adjusted with the above two conditions satisfied.

Figure 10:
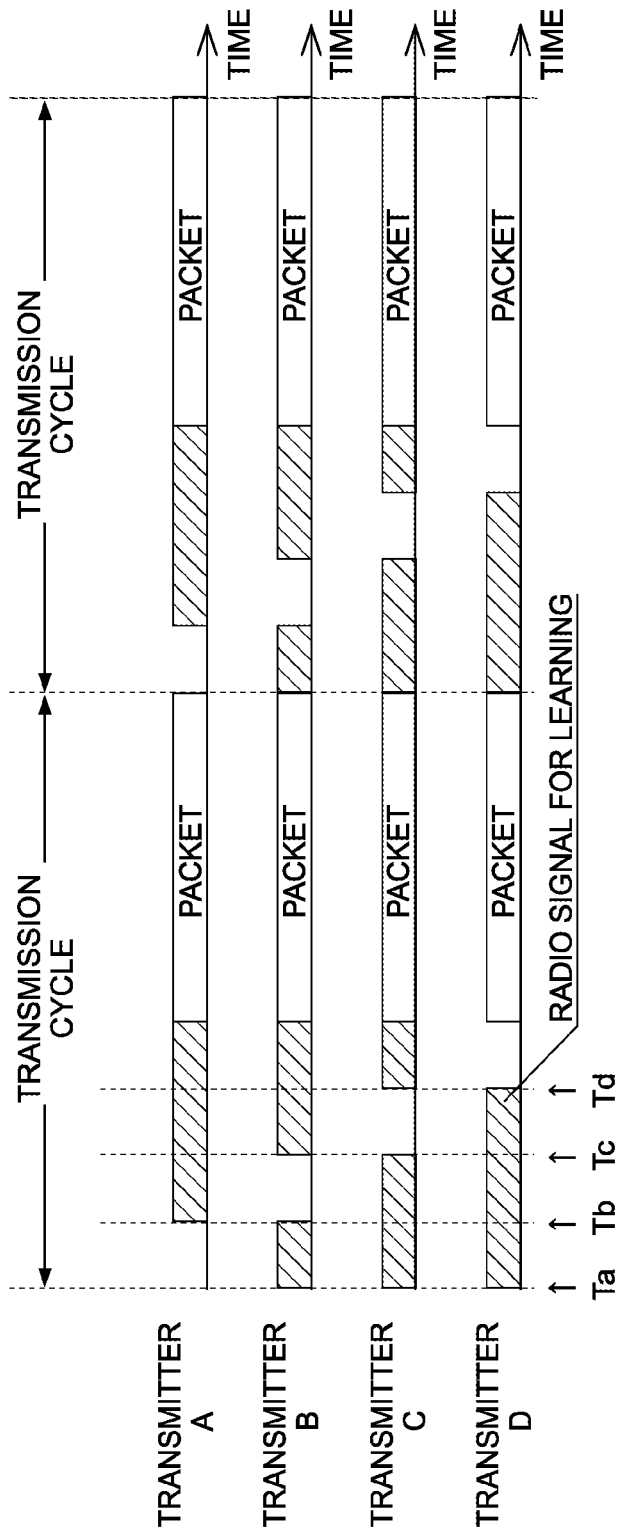
FIG. 10 is an explanatory diagram of transmission timings of a packet and a radio signal for learning of each receiver of the radio communication system according to the second embodiment.

For example, if the number of transmitters 30 is four, the master receiver 20 adjusts the transmission timings of the packet and the radio signal for learning of each transmitter 30 so that each transmitter 30 (transmitters A to D in the figure) transmits a packet and a radio signal for learning at a timing as illustrated in FIG. 10. Hereinafter, the time zone in which only the transmitter 30 in a certain communication system does not transmit a radio signal for learning (a time zone from Ta to Tb in FIG. 10, and among others) is referred to as a learning period for the communication system.

The master receiver 20, when completing the adjustment of the transmission timings of a packet and the like of each transmitter 30, notifies the start timing of the learning period for the corresponding communication system (a time zone in which only the transmitter 30 in the corresponding communication system does not transmit a radio signal for learning) and the transmission timing of a packet of the transmitter 30 to the receiver 20 of each of the other communication systems. It is noted that in the case illustrated in FIG. 10, Ta, Tb, Tc, and Td are the start timings of learning periods for the communication systems A, B, C, and D, respectively.

Figure 11:
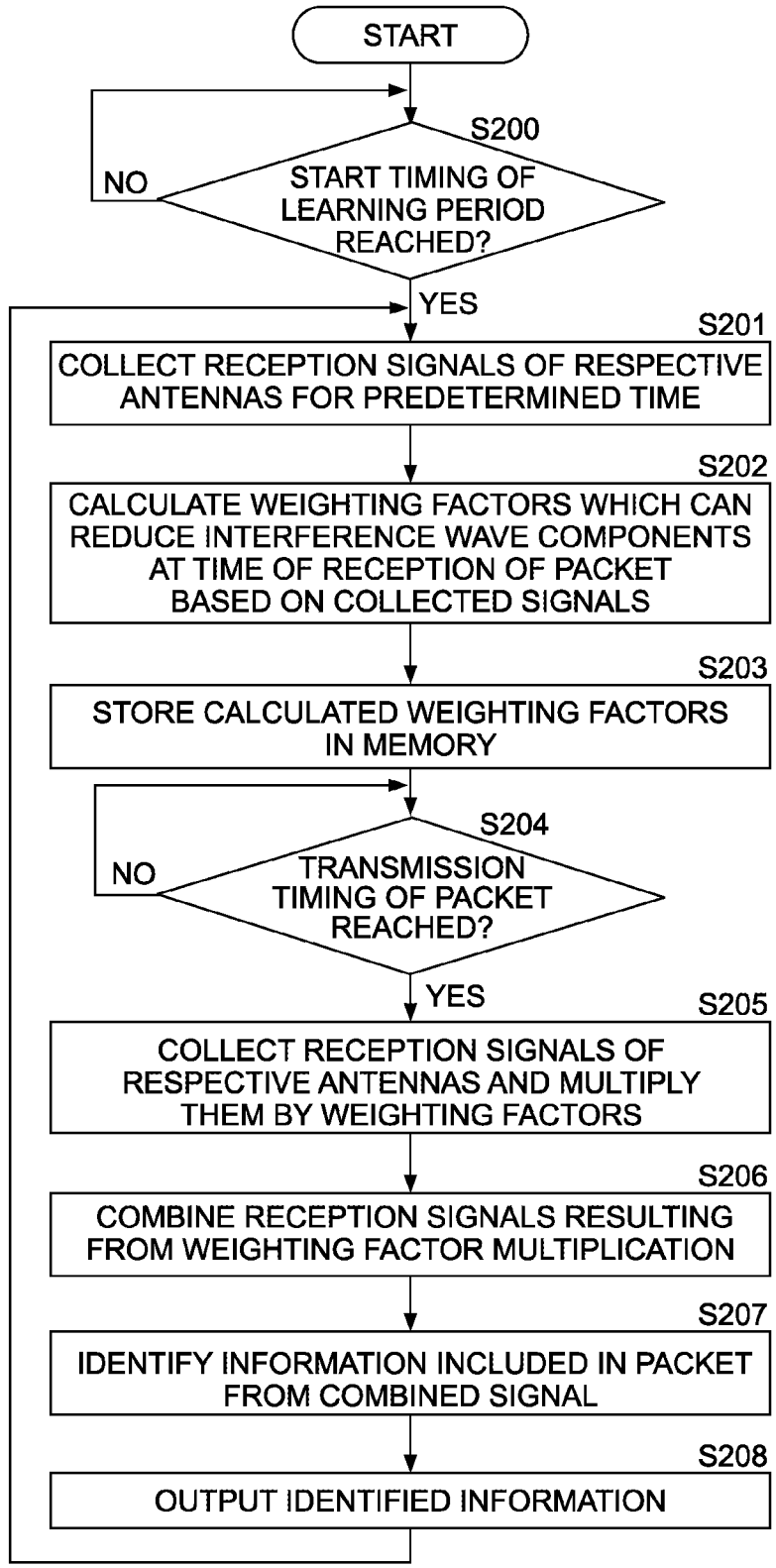
FIG. 11 is a flowchart of a second data reception process performed by a receiver of the radio communication system according to the second embodiment.

When the start timing of the learning period and the transmission timing of the packet are notified, the MPU 23 of each receiver 20 starts a second data reception process of a procedure illustrated in FIG. 11 by using each notified timing. Further, the MPU 23 of the master receiver 20 starts the second data reception process of the procedure illustrated in FIG. 11 by using the learning period for the corresponding communication system, which is obtained from the transmission timing of the radio signal for learning determined by the MPU 23 itself and the transmission timing of the packet of each transmitter 30 determined by the MPU 23 itself.

Hereinafter, the contents of the second data reception process will be described focusing on differences from the data reception process (FIG. 4).

As illustrated in FIG. 11, the MPU 23, which has started the second data reception process, first waits (monitors) for the start timing of the learning period for the corresponding communication system in step S200. Then, when the start timing of the learning period for the corresponding communication system is reached (step S200; YES), the MPU 23 collects reception signals of the respective antennas 21 for a predetermined time (step S201). The predetermined time in step S201 is a time previously determined that is equal to or less than the length of the learning period.

Thereafter, the MPU 23 performs the same processes as steps S102 to S108 in steps S202 to S208, respectively. Then, the MPU 23, when completing the process of step S208, returns to step S200 and waits for the start timing of the next learning period for the corresponding communication system.

Figure 12:
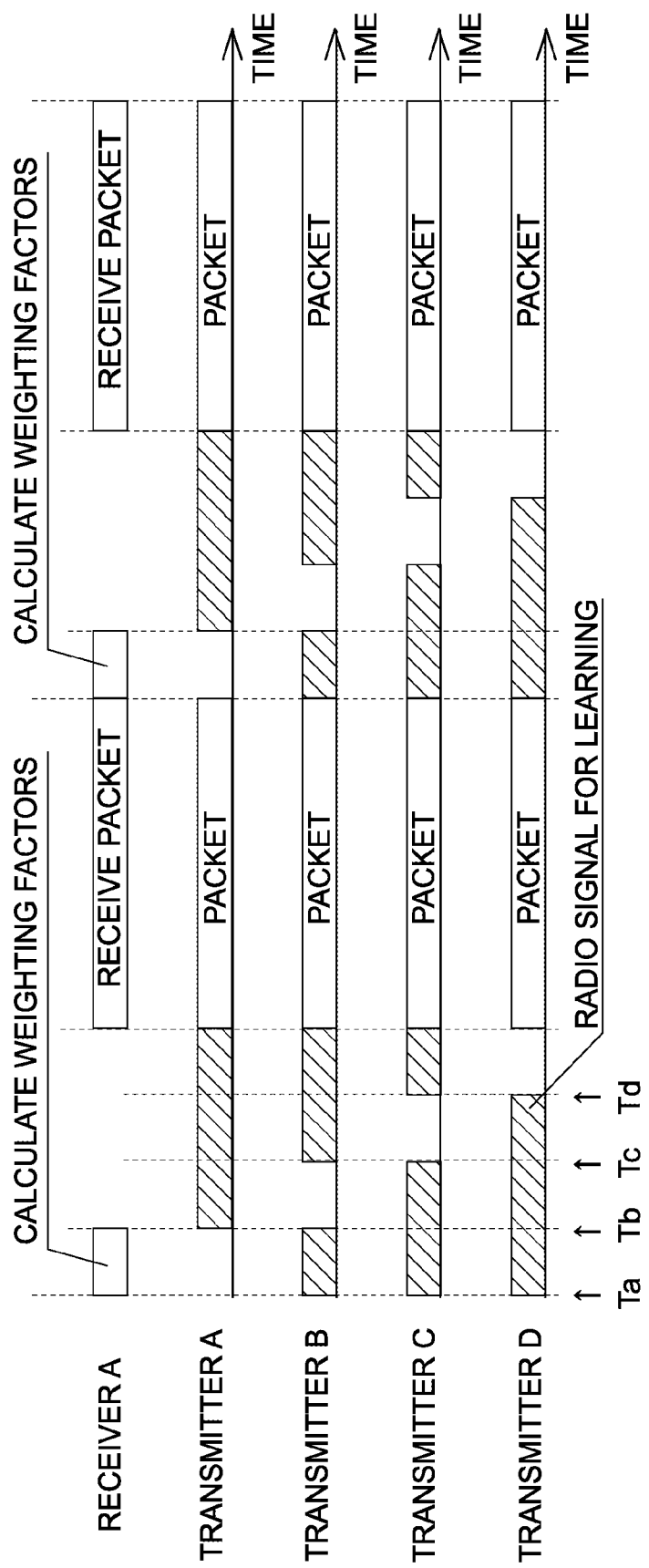
FIG. 12 is an explanatory diagram of an operation of the radio communication system according to the second embodiment.

As apparent from the above description, if the number of transmitters 30 in the radio communication system is four, the receiver 20 of the communication system A and the transmitters 30 of the communication systems A to D operate as illustrated in FIG. 12.

That is, transmitters A to B, which are the transmitters 30 of the communication systems A to D, respectively, transmit packets at the same timing. Further, the transmitters A to B transmit radio signals for learning in patterns such that there are a time zone in which only the transmitter A does not transmit a radio signal for learning (Ta to Tb), a time zone in which only the transmitter B does not transmit a radio signal for learning (Tb to Tc), a time zone in which only the transmitter C does not transmit a radio signal for learning (Tc to Td), and a time zone in which only the transmitter does not transmit a radio signal for learning (Td to the transmission timing of a packet), respectively.

On the other hand, the receiver A, which is the receiver 20 of the communication system A, performs the second data reception process by using Ta and the transmission timing of the packet. Accordingly, although the transmitter A does not transmit a radio signal for learning, the receiver A calculates weighting factors from the received signals of the respective antennas 21 in the time zone (Ta to Tb) in which the transmitters B to D transmit the radio signal for learning.

Since the radio signal for learning is a radio signal with the same frequency and intensity as the packet, the signals received by the respective antennas 21 within the above time zone are signals corresponding to the packets transmitted by the transmitters B to D (hereinafter referred to as first type interference waves) plus interference waves not due to the packets (hereinafter referred to as second interference waves). Further, in the radio communication system according to the present embodiment, based on the plurality of signals received by the plurality of receivers in the time zone, a weighting factor for each antenna is calculated such that a composite signal obtained by combining signals each resulting from multiplying each of the plurality of signals by the corresponding weighting factor is minimized, and the calculated weighting factor is used for processing the packet from the transmitter A. Accordingly, if the condition of the second type interference waves at the time of calculation of the weighting factors and the condition of the second type interference waves at the time of reception of the packet are the same, the composite signal generated at the time of reception of the packet does not include any component due to the first type interference waves or the second type interference waves. Therefore, this radio communication system functions as a system capable of well performing communication between the transmitter and the receiver even in the presence of radio noise, that is, a system suitable for use in a factory or the like.

Further, in a system including a plurality of transmitters configured to transmit packets with a same frequency and a plurality of receivers, it is normally necessary to shift the transmission time of packets of the respective transmitters in order to well perform communication between the transmitter and the receiver, and it is also necessary to extend the transmission cycle of packets (that is, reduce the amount of information to be communicated within a unit time) in order to shift the transmission time of packets of the respective transmitters. Further, according to the radio communication system of the present embodiment, even when several transmitters transmit packets at a same time, the respective receivers can receive the packets without any problem. Therefore, the radio communication system according to the present embodiment is also a system allowing a large amount of information to be communicated within a unit time, as compared to the system in which the transmission time of packets of the respective transmitters is shifted.

Third Embodiment

Hereinafter, a radio communication system according to a third embodiment of the present invention will be described focusing on differences from the radio communication system according to the second embodiment.

Figure 13:
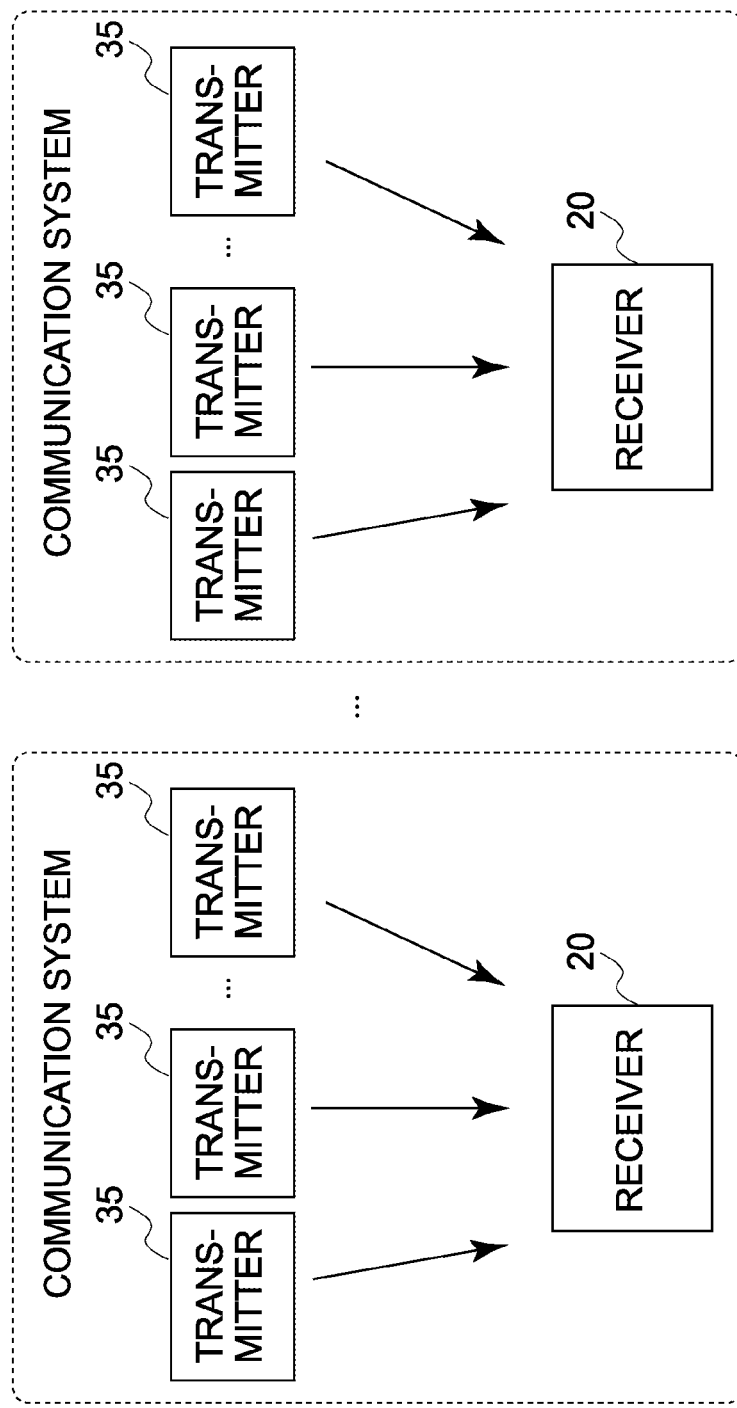
FIG. 13 is a block diagram of a radio communication system according to a third embodiment of the present invention.

FIG. 13 illustrates an example of the configuration of a third radio communication system (a radio communication system according to the third embodiment). As illustrated, the third radio communication system includes a plurality of communication systems each including a plurality of transmitters 35 and one receiver 20.

The receiver 20 (hereinafter, also referred to as a third receiver 20) serving as a component of the third radio communication system is a device obtained by modifying the receiver 20 of the second radio communication system so that the MPU 23 performs processes (details of which will be described later) different from the processes described above.

The transmitter 35 serving as a component of the third radio communication system is a device having the same function as the transmitter 30.

Then, at the time of setup of the third radio communication system, the transmission timings of the packet of each transmitter 35 and the radio signal for learning are adjusted by using the timing changing function of each transmitter 35 so as to satisfy the following two conditions.

Condition 1: The respective transmitters 35 in the same communication system sequentially transmits packets. Hereinafter, the transmitter 35 that transmits a packet at the n-th position is referred to as an n-th transmitter. Condition 2: The n-th transmitter in each communication systems transmits a packet at a same time. Condition 3: For each communication system and each value n in the radio communication system, there is a time zone in which the n-th transmitters in the respective communication systems other than the corresponding communication system transmit radio signals for learning but other transmitters 35 do not transmit a signal for learning.

Specifically, at the time of setup of the second communication system, by an operation on a higher-level device coupled to a certain receiver 20, work of setting in the receiver 20 (hereinafter referred to as the master receiver 20) a device ID of each transmitter 35 and a device ID of the receiver 20 is performed for each communication system. When the work is completed, the master receiver 20 (NPU 23) communicates with each transmitter 35 by using the device ID, so that the transmission timings of the packet and the radio signal for learning of each transmitter 35 are adjusted with Conditions 1 to 3 satisfied.

Figure 14:
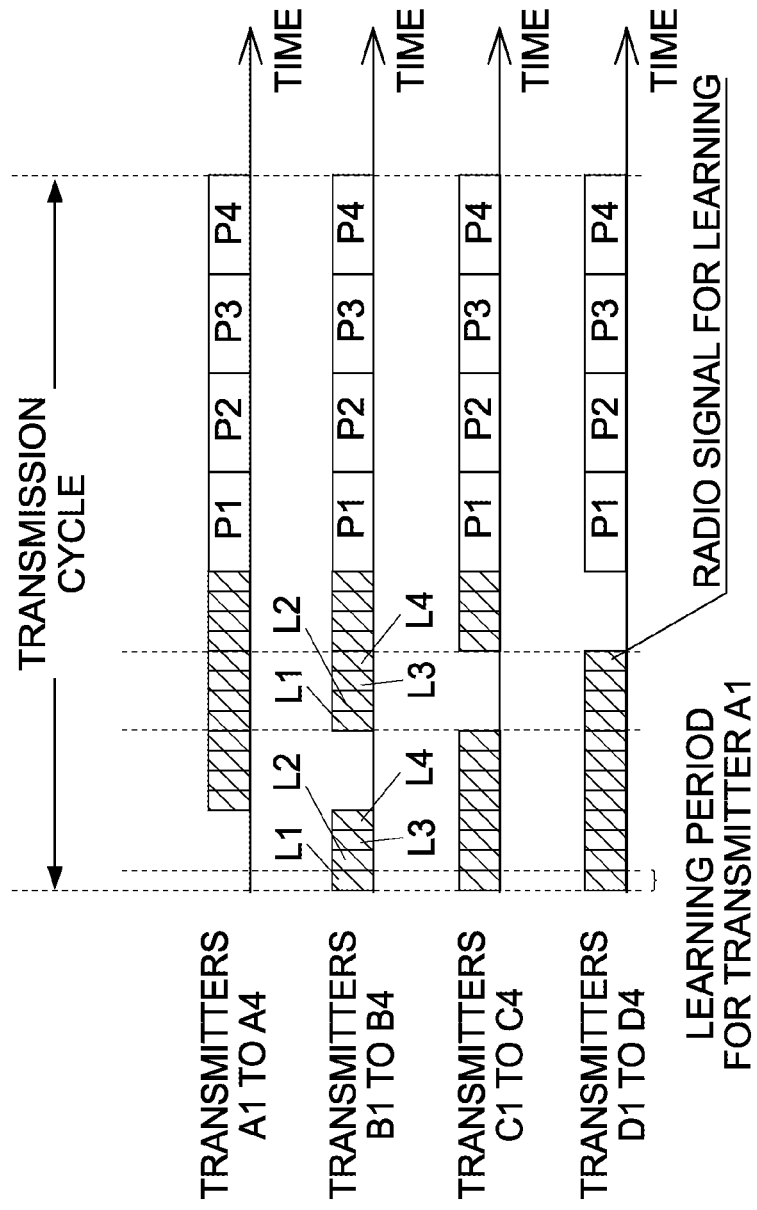
FIG. 14 is an explanatory diagram of an operation of the radio communication system according to the third embodiment.

For example, if the number of transmitters 35 of each communication system is four, the master receiver 20 adjusts the transmission timings of the packet and the radio signal for learning of each transmitter 30 so that each transmitter 35 transmits a packet and a radio signal for learning at a timing as illustrated in FIG. 14.

In FIG. 14 and the following description, transmitters A1 to A4 are the first to fourth transmitters in the communication system A, respectively. Transmitters B1 to B4 are the first to fourth transmitters in the communication system B, respectively. Transmitters C1 to C4 are the first to fourth transmitters in the communication system C, respectively. Transmitters D1 to D4 are the first to fourth transmitters in the communication system B, respectively. Further, P1 to P4 are packets transmitted by the first to fourth transmitters, respectively, and L1 to L4 are radio signals for learning transmitted by the first to fourth transmitters, respectively.

A transmission pattern of the radio signal for learning of each transmitter 35 illustrated in FIG. 14 indicates that a period in which no packet is transmitted is sectioned into four (=the number of communication systems), and that radio signals for learning are transmitted sequentially from the first to fourth transmitters in the communication systems B to C in a first section; radio signals for learning are transmitted sequentially from the first to fourth transmitters in the communication systems A, C, and D in a second section; radio signals for learning are transmitted sequentially from the first to fourth transmitters in the communication systems A, B, and C in a third section; and radio signals for learning are transmitted sequentially from the first to fourth transmitters in the communication systems A to C in a fourth section. However, since there are various transmission patterns for a radio signal for learning that satisfy Condition 3, any pattern other than that illustrated in FIG. 14 may be adopted.

The master receiver 20, when completing the adjustment of the transmission timings of a packet and the like of each transmitter 35, notifies to the receiver 20 of each of the other communication systems the start timing of the learning period for each transmitter 35 of the corresponding communication system and the transmission timing of a packet of the transmitter 35. It is noted that a learning period for the k-th transmitter of a communication system Y (hereinafter also referred to as the k-th learning period) is a time zone in which the k-th transmitters in the respective communication systems other than the communication system Y each transmit a radio signal for learning but each of the other transmitters 35 does not transmit a signal for learning.

Figure 15:
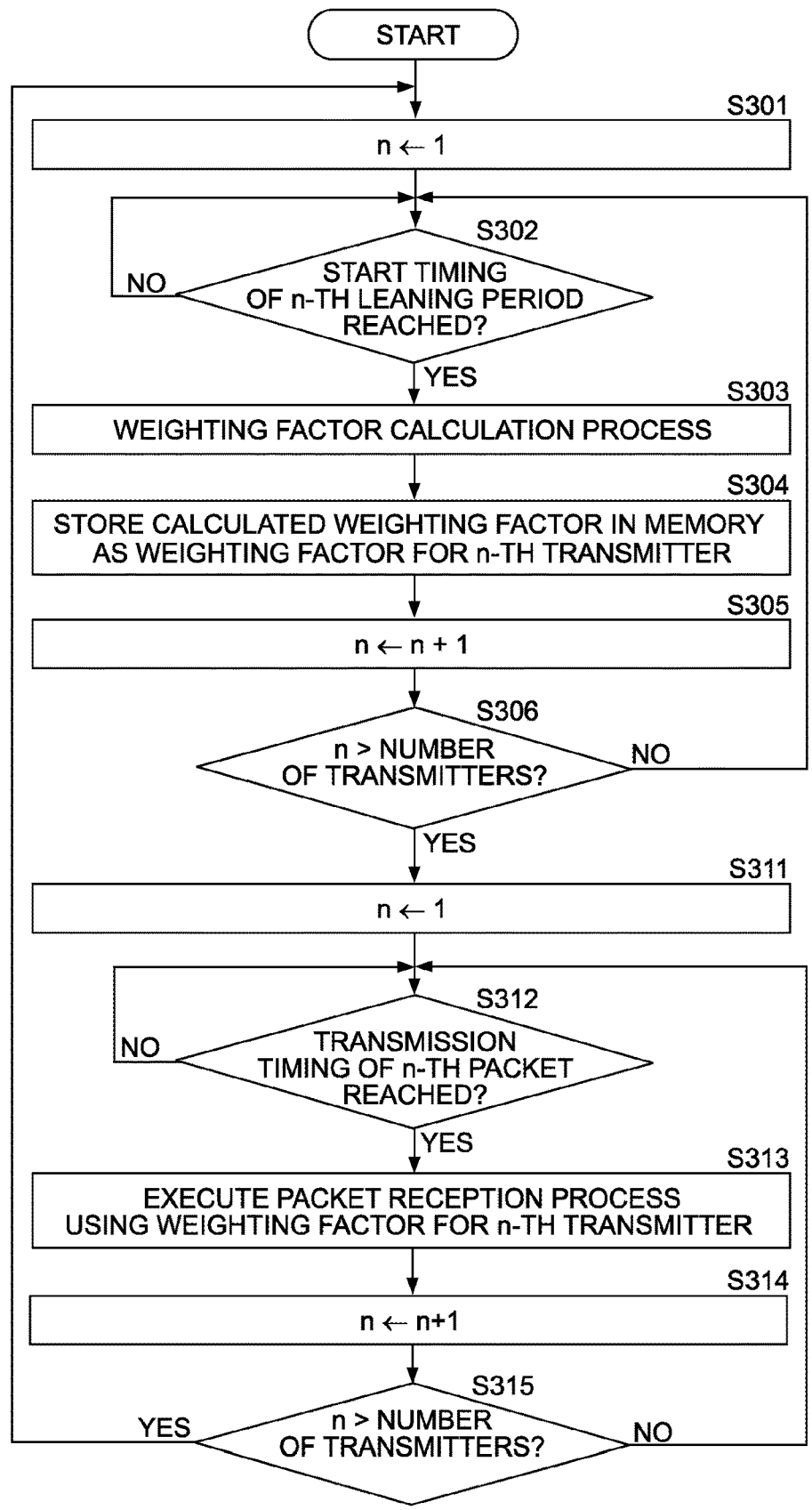
FIG. 15 is a flowchart of a third data reception process performed by a receiver of the radio communication system according to the third embodiment.

When the start timing of the learning period and the transmission timing of the packet are notified, the MPU 23 of each receiver 20 starts a third data reception process of a procedure illustrated in FIG. 15 by using each notified timing. Further, the NPU 23 of the master receiver 20 starts the third data reception process of the procedure illustrated in FIG. 15 by using the learning period for the corresponding communication system, which is obtained from the transmission timing of the radio signal for learning determined by the MPU 23 itself and the transmission timing of the packet of each transmitter 35 determined by the MPU 23 itself.

Then, the MPU 23, when starting the third data reception process, first sets "1" to a variable n (step S301). Next, the MPU 23 waits (monitors) for the start timing of the n-th learning period (learning period for the n-th transmitter) (step S302; NO). Then, when the start timing of the n-th learning period is reached (step S302; YES), the MPU 23 performs a weighting factor calculation process (step S303). This weighting case calculation process is the same process as the processes of steps S201 and S2002.

The MPU 23, when completing the weighting factor calculation process, stores the weighting factor calculated in the process in the memory 24 as a weighting factor for the n-th transmitter (step S304). Next, the NPU 23 increments n by "1" (step S305), and then determines whether the value of the incremented n is greater than the number of transmitters 35 in the corresponding communication system (step S306).

When the value of n is equal to or less than the number of transmitters 35 in the corresponding communication system (step S306; NO), the MPU 23 executes the process of step S302 and the subsequent processes again.

When the value of n is greater than the number of transmitters 35 in the corresponding communication system while the above processes are repeated (step S306; YES), the MPU 23 sets the variable n to "1" (step S311). Next, the MPU 23 waits (monitors) for the n-th packet transmission timing (transmission timing of a packet of the n-th transmitter) (step S312; NO). Here, the n-th packet transmission timing is the transmission timing of a packet of the n-th transmitter.

When the n-th packet transmission timing is reached (step S312; YES), the MPU 23 performs a packet reception process using a weighting factor for the n-th transmitter (step S313). The packet reception process performed in step S313 is the same as the processes in steps S205 to S208.

The MPU 23, when completing the step of S313, increments n by "1" (step S314), and then determines whether the value of the incremented n is greater than the number of transmitters 35 in the corresponding communication system (step S315).

When the value of n is equal to or less than the number of transmitters 35 in the corresponding communication system (step S315; NO), the MPU 23 executes the process of step S312 and the subsequent processes again.

When the value of n is greater than the number of transmitters 35 in the corresponding communication system while the above processes are repeated (step S315; YES), the MPU 23 starts the process of step S301 and the subsequent processes.

As apparent from the above description, the radio communication system according to the present embodiment is a system obtained by modifying the second radio communication system so that each receiver 20 can accommodate the plurality of transmitters 35 (30) by time multiplexing. Therefore, as with the radio communication system according to the above-described second embodiment, the radio communication system according to the third embodiment is a system capable of well performing communication between the transmitter and the receiver even in the presence of radio noise, and also a system allowing a large amount of information to be communicated within a unit time, as compared to the system in which the transmission time of packets of all transmitters is shifted.

<<Modification>>

The radio communication system according to each of the above-described embodiments can be variously modified. For example, when the time change of the interference waves is small, there is no problem in communication between the transmitter and the receiver even if the processes of steps S101 to S103 (FIG. 4), the processes of steps S200 to S203 (FIG. 10), and the processes of steps S301 to S306 (FIG. 15) are not performed each time. In addition, since the power consumption of the receiver 20 is reduced by not performing each process, the receiver 20 of the radio communication system according to each embodiment may have a function of receiving the specification of an execution frequency of each process to execute each process the specified frequency.

The wireless system according to the third embodiment may be modified into a system in which the plurality of transmitters 35 are accommodated in the receiver 20 by frequency multiplexing. It is noted that such a modification can be realized by modifying the receiver 20 of the wireless system according to the third embodiment into a device in which the MPU 23 performs the second data reception process for each frequency.

Furthermore, the radio communication system according to each embodiment may be modified into a system having specific configuration and processing procedure of the respective components which are different from those described above, as a matter of course.

REFERENCE SIGNS LIST

10, 18, 30, 35 Transmitter
11 Sensor
12, 23, 32 MPU
13 RFIC
14, 21 Antenna
20 Receiver
22 Receiving circuit
24 Memory
25 Output IF

The invention claimed is:

1. A radio communication system comprising:
    a receiver; and
    a transmitter configured to periodically transmit a radio signal for information transmission including information to be notified to the receiver;
    wherein the receiver includes
    a plurality of antennas;
    a composite signal generation unit configured to generate a composite signal by multiplying a signal output from each antenna when receiving the radio signal for information transmission by a weighting factor for the each antenna to combine the resulting signals from the respective antennas each having been applied with the weighting factor;
    a reception processing unit configured to identify information included in the radio signal for information transmission based on the composite signal generated by the composite signal generation unit; and
    a weighting factor generation unit configured to generate the weighting factor for each antenna that is used for the composite signal generation unit to generate the composite signal, wherein the weighting factor generation unit generates the weighting factor for each antenna based on a plurality of signals output from the plurality of antennas during a period in which the transmitter does not transmit the radio signal for information transmission such that a composite signal obtained by combining signals each resulting from multiplying each of the plurality of signals by the corresponding weighting factor is minimized.

2. A radio communication system comprising a plurality of communication systems,
    wherein each of the plurality of communication systems includes
    a receiver; and
    a transmitter configured to periodically transmit a radio signal for information transmission including information to be notified to the receiver and to transmit a radio signal for learning with a same frequency and a same intensity as the radio signal for information transmission during a period in which the radio signal for information transmission is not transmitted,
    the transmitter of each communication system transmits the radio signal for information transmission at a same time,
    the transmitter of each communication system transmits the radio signal for learning for each of the plurality of communication systems so that there is a time zone in which the transmitter of the corresponding communication system does not transmit the radio signal for learning but the transmitters of other communication systems transmit the radio signal for learning, and
    the receiver of each communication system includes
    a plurality of antennas;
    a composite signal generation unit configured to generate a composite signal by multiplying a signal output from each antenna when receiving the radio signal for information transmission from the transmitter of the corresponding communication system by a weighting factor for the each antenna to combine the resulting signals from the respective antennas each having been applied with the weighting factor, a reception processing unit configured to identify information included in the radio signal for information transmission from the transmitter of the corresponding communication system, from the composite signal generated by the composite signal generation unit; and a weighting factor generation unit configured to generate the weighting factor for each antenna that is used for the composite signal generation unit to generate the composite signal, wherein the weighting factor generation unit generates the weighting factor for each antenna based on a plurality of signals output from the plurality of antennas in the time zone in which the transmitter of the corresponding communication system does not transmit the radio signal for learning but the transmitters of other communication systems transmit the radio signal for learning such that a composite signal obtained by combining signals each resulting from multiplying each of the plurality of signals by the corresponding weighting factor is minimized.

3. A radio communication system including first to N-th communication systems (N≥2), wherein each of the first to N-th communication systems includes a receiver; and first to M-th transmitters (M≥2) each configured to periodically transmit a radio signal for information transmission including information to be notified to the receiver and to transmit a radio signal for learning with a same frequency and a same intensity as the radio signal for information transmission during a period in which the radio signal for information transmission is not transmitted, the first to M-th transmitters of each communication system sequentially transmit the radio signal for information transmission, a k-th transmitter (k=1 to M) of the first to N-th communication systems transmits the radio signal for information transmission at a same time, each transmitter included in the radio communication system transmits the radio signal for learning for each combination of a value i ranging from 1 to N and a value j ranging from 1 to M so that there is a time zone in which a j-th transmitter of each communication system other than an i-th communication system transmits the radio signal for learning but other transmitters do not transmit the radio signal for learning, and the receiver of each communication system includes a plurality of antennas;

a composite signal generation unit configured to generate a composite signal by multiplying a signal output from each antenna when receiving the radio signal for information transmission by a weighting factor to combine the resulting signals from the respective antennas each having been applied with the weighting factor, the composite signal generation unit generating the composite signal by using a weighting count for the transmitter having transmitted the received radio signal for information transmission;

a reception processing unit configured to identify information included in the received radio signal for information transmission, from the composite signal generated by the composite signal generation unit; and a weighting factor generation unit configured to generate and manage weighting factors for the first to M-th transmitters used by the composite signal generation unit, wherein the weighting factor generation unit generates the weighting factor for each antenna based on a plurality of signals output from the plurality of antennas in a time zone in which a k-th transmitter of each communication system other than the corresponding communication system transmits the radio signal for learning but other transmitters do not transmit the radio signal for learning such that a composite signal obtained by combining signals each resulting from multiplying each of the plurality of signals by the corresponding weighting factor is minimized, and manages the generated weighting factor as a weighting factor for the k-th transmitter.

* * * * *

UNITED STATES PATENT AND TRADEMARK OFFICE
CERTIFICATE OF CORRECTION

PATENT NO. : 10,601,490 B2  
APPLICATION NO. : 16/346686  
DATED : March 24, 2020  
INVENTOR(S) : Ueyama et al.

Page 1 of 1

It is certified that error appears in the above-identified patent and that said Letters Patent is hereby corrected as shown below:

On the Title Page

Under abstract, "3 Claims, 14 Drawing Sheets" should read --2 Claims, 14 Drawing Sheets--.

In the Claims

Column 16, Line 9, Claim 1 should be removed, Claims 2 and 3 should be renumbered as Claims 1 and 2.

Signed and Sealed this  
Thirteenth Day of October, 2020

Andrei Iancu  
*Director of the United States Patent and Trademark Office*